US012609086B2

(12) United States Patent
Lee et al.

(10) Patent No.: US 12,609,086 B2
(45) Date of Patent: Apr. 21, 2026

(54) LEVEL SHIFTER AND DISPLAY DEVICE INCLUDING SAME

(71) Applicant: LG Display Co., Ltd., Seoul (KR)

(72) Inventors: Sang Uk Lee, Paju-si (KR); Hoon Jang, Paju-si (KR); Jung Jae Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/931,912

(22) Filed: Oct. 30, 2024

(65) Prior Publication Data

US 2025/0218392 A1 Jul. 3, 2025

(30) Foreign Application Priority Data

Dec. 29, 2023 (KR) ........................ 10-2023-0197308

(51) Int. Cl.

| | |
|---|---|
| ***G09G 3/3266*** | (2016.01) |
| ***G09G 3/32*** | (2016.01) |
| ***G09G 3/3233*** | (2016.01) |
| ***G09G 3/36*** | (2006.01) |

(52) U.S. Cl.

CPC ............. *G09G 3/3266* (2013.01); *G09G 3/32* (2013.01); *G09G 3/3233* (2013.01); *G09G 3/3677* (2013.01); *G09G 2310/0267* (2013.01); *G09G 2310/0286* (2013.01); *G09G 2310/0289* (2013.01); *G09G 2310/08* (2013.01)

(58) Field of Classification Search

CPC ...... G09G 3/3266; G09G 3/32; G09G 3/3233; G09G 3/3677; G09G 2310/0267; G09G 2310/0286; G09G 2310/0289; G09G 2310/08

See application file for complete search history.

(56) References Cited

U.S. PATENT DOCUMENTS

| | | | | |
|---|---|---|---|---|
| 3,389,245 | A * | 6/1968 | Deregt | H03K 21/00 377/33 |
| 6,333,725 | B1 * | 12/2001 | Kim | G09G 3/288 345/60 |
| 10,972,101 | B2 * | 4/2021 | Luthra | H03K 19/0013 |
| 2006/0055570 | A1 * | 3/2006 | Khan | H03K 3/356113 341/51 |
| 2006/0232526 | A1 * | 10/2006 | Guttag | G09G 3/34 345/84 |
| 2008/0054979 | A1 * | 3/2008 | Nagumo | H03K 3/356104 327/309 |
| 2009/0213101 | A1 * | 8/2009 | Murase | G09G 3/3688 345/211 |

(Continued)

FOREIGN PATENT DOCUMENTS

KR 102277714 B1 7/2021

*Primary Examiner* — Ke Xiao
*Assistant Examiner* — Jennifer L Zubajlo
(74) *Attorney, Agent, or Firm* — Seed Intellectual Property Law Group LLP

(57) ABSTRACT

A display apparatus includes a display panel configured to display an image, a level shifter configured to extract and output data from a data map of a memory and divide a serial output signal output thereto into a parallel output signal to output periodic signals, based on an enable signal, and a shift register configured to output gate signals which are to be applied to the display panel, based on the periodic signals output from the level shifter.

19 Claims, 18 Drawing Sheets

(56) References Cited

U.S. PATENT DOCUMENTS

| | | | | |
|---|---|---|---|---|
| 2009/0315582 | A1* | 12/2009 | Agatsuma | G01R 31/318544 324/750.3 |
| 2011/0096106 | A1* | 4/2011 | Nomaguchi | G09G 3/2092 345/691 |
| 2013/0249781 | A1* | 9/2013 | Park | G09G 3/3611 345/99 |
| 2015/0364114 | A1* | 12/2015 | Smith | G09G 3/3696 345/89 |
| 2016/0125840 | A1* | 5/2016 | Oh | G09G 5/006 345/76 |
| 2016/0180823 | A1* | 6/2016 | Cho | G09G 5/18 345/567 |
| 2017/0116906 | A1* | 4/2017 | Tai | G09G 3/3696 |
| 2018/0122294 | A1* | 5/2018 | Do | G09G 5/008 |
| 2018/0211605 | A1* | 7/2018 | Kim | G09G 3/3685 |
| 2019/0043427 | A1* | 2/2019 | Jeong | G09G 5/006 |
| 2020/0020280 | A1* | 1/2020 | Han | G09G 3/3266 |
| 2022/0068179 | A1* | 3/2022 | Jang | G09G 3/20 |
| 2023/0215338 | A1* | 7/2023 | Lee | G09G 3/2096 345/55 |
| 2023/0215398 | A1* | 7/2023 | Lee | G09G 3/2088 345/1.3 |

* cited by examiner

LEVEL SHIFTER AND DISPLAY DEVICE INCLUDING SAME

CROSS-REFERENCE TO RELATED APPLICATIONS

This application claims the benefit of the Korean Patent Application No. 10-2023-0197308 filed on Dec. 29, 2023, which is hereby incorporated by reference as if fully set forth herein.

BACKGROUND

Technical Field

The present disclosure relates to a level shifter and a display apparatus including the same.

Description of the Related Art

As information technology advances, the market for display apparatuses which are connection mediums connecting a user with information is growing. Therefore, the use of display apparatuses such as light emitting display apparatuses, quantum dot display (QDD) apparatuses, and liquid crystal display (LCD) apparatuses is increasing.

The display apparatuses described above include a display panel which includes a plurality of subpixels, a driver which outputs a driving signal for driving the display panel, and a power supply which generates power which is to be supplied to the display panel or the driver.

In such display apparatuses, when the driving signal (for example, a scan signal and a data signal) is supplied to each of the subpixels provided in the display panel, a selected subpixel may transmit light or may self-emit light, and thus, an image may be displayed.

BRIEF SUMMARY

The present disclosure may generate clock signals to simplify a signal for controlling a level shifter, based on a data map (a sequence-based logic value) stored in a memory, and may also reduce the number of input pins. Also, the present disclosure may monitor a driving state of the level shifter, based on communication between a timing controller and the level shifter and may easily change and control an output condition of the level shifter to enhance the general purpose of an apparatus. Also, the present disclosure may store a marker for addressing a specific clock signal, may implement a repeated sequence by using an enable signal and a driving selection signal, and may designate an output timing.

As embodied and broadly described herein, a display apparatus includes a display panel configured to display an image, a level shifter configured to extract and output data from a data map of a memory and divide a serial output signal output thereto into a parallel output signal to output periodic signals, based on an enable signal, and a shift register configured to output gate signals which are to be applied to the display panel, based on the periodic signals output from the level shifter.

The level shifter may include a controller configured to generate a count signal so as to extract data from the data map of the memory, based on the enable signal and a bit split circuit configured to divide the serial output signal into the parallel output signal.

The data map may include data where logic values to be output by channels for each address are sequentially stored.

The level shifter may shift an address value of the data map whenever the enable signal is applied to be first logic, and whenever the enable signal is applied to be second logic which is opposite to the first logic, the level shifter may extract, as an output signal, data included in the address value of the data map to output the output signal as the periodic signals.

The level shifter may include a selector configured to generate a selection signal for selecting an operation condition of the controller, based on the enable signal and a driving selection signal.

The controller may include a plurality of markers configured to respectively store address values differentiated from one another, a counter configured to generate a count signal, based on the enable signal, and a de-multiplexer configured to output an enable control signal controlling an enable switch so that the enable signal is applied to the counter and a marker control signal turning on one of marker switches so that an address value included in one of the plurality of markers is applied to an address signal input terminal of the counter, based on the selection signal.

The enable signal and the driving selection signal may be output from a timing controller connected to the level shifter, and an input or output condition of the level shifter may be changed based on bidirectional data communication with the timing controller.

The level shifter may shift an address value of the data map whenever the enable signal is applied to be first logic, and whenever the enable signal is applied to be second logic which is opposite to the first logic, the level shifter may extract, as an output signal, data included in the address value of the data map to output the output signal as the periodic signals, and the marker control signal may be applied as a pulse type when the enable signal is applied to be the first logic.

In another aspect of the present disclosure, a level shifter includes a memory including a data map where logic values to be output by channels for each address are sequentially stored, a controller configured to generate a count signal and extract data from the data map of the memory, based on an enable signal, and a bit split circuit configured to divide a serial output signal, output from the memory, into a parallel output signal.

The controller may shift an address value of the data map whenever the enable signal is applied to be first logic, and whenever the enable signal is applied to be second logic which is opposite to the first logic, the controller may extract, as an output signal, data included in the address value of the data map to output the output signal as periodic signals.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

A display apparatus according to the present disclosure may be applied to televisions (TVs), video players, personal computers (PCs), home theaters, electronic devices for vehicles, and smartphones, but is not limited thereto. The display apparatus according to the present disclosure may be implemented as a light emitting display apparatus, a quantum dot display (QDD) apparatus, or a liquid crystal display (LCD) apparatus. Hereinafter, for convenience of description, a light emitting display apparatus self-emitting light by using an inorganic light emitting diode or an organic light emitting diode will be described for example.

Moreover, a transistor described below may be implemented with an n-type transistor, a p-type transistor, or a combination of an n-type transistor and a p-type transistor. A transistor may be a three-electrode element including a gate, a source, and a drain. The source may be an electrode which provides a carrier to a transistor. In the transistor, a carrier may start to flow from the source. The drain may be an electrode where the carrier flows from the transistor to the outside. That is, in the transistor, the carrier flows from the source to the drain.

In the p-type transistor, because a carrier is a hole, a source voltage may be higher than a drain voltage so that the hole flows from the source to the drain. In the p-type transistor, because the hole flows from the source to the drain, a current may flow from the source to the drain. On the other hand, in the n-type transistor, because a carrier is an electron, a source voltage may be lower than a drain voltage so that the electron flows from the source to the drain. In the n-type transistor, because the electron flows from the drain to the source, a current may flow from the drain to the source. However, a source and a drain of a transistor may switch therebetween based on a voltage applied thereto. Based thereon, in the following description, one of a source and a drain will be described as a first electrode, and the other of the source and the drain will be described as a second electrode.

Figure 1:
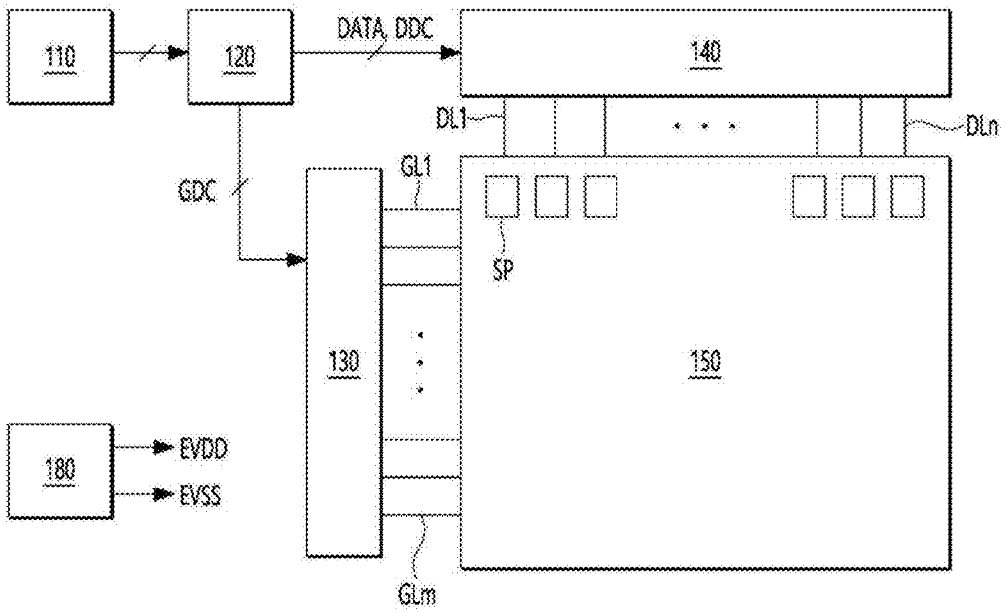
FIG. 1 is a block diagram schematically illustrating a light emitting display apparatus.
Figure 2:
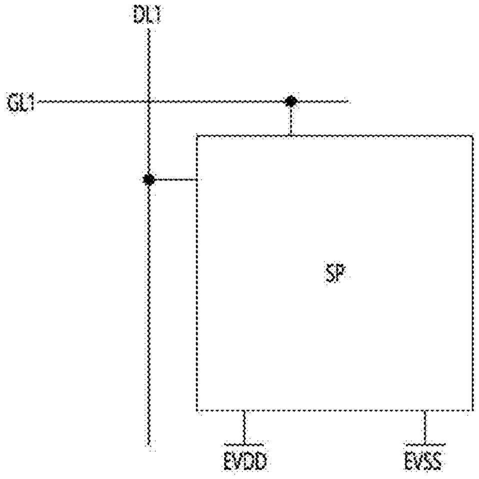
FIG. 2 is a block diagram schematically illustrating a subpixel illustrated in FIG. 1.

FIG. 1 is a block diagram schematically illustrating a light emitting display apparatus, and FIG. 2 is a block diagram schematically illustrating a subpixel illustrated in FIG. 1.

As illustrated in FIGS. 1 and 2, a light emitting display apparatus according to an embodiment of the present disclosure may include a video supply unit 110, a timing controller 120, a gate driver (a gate driving circuit) 130, a data driver (a data driving circuit) 140, a display panel 150, and a power supply 180.

The video supply unit 110 (a set or a host system) may output a video data signal supplied from the outside or an image data signal stored in an internal memory thereof. The video supply unit 110 may supply a data signal and the various driving signals to the timing controller 120.

The timing controller 120 may output a gate timing control signal GDC for controlling an operation timing of the gate driver 130, a data timing control signal DDC for controlling an operation timing of the data driver 140, and various synchronization signals. The timing controller 120 may provide the data driver 140 with the data timing control signal DDC and a data signal DATA supplied from the video supply unit 110. The timing controller 120 may be implemented as an integrated circuit (IC) type and may be mounted on a printed circuit board (PCB), but is not limited thereto.

The gate driver 130 may output a gate signal (or a gate voltage) in response to the gate timing control signal GDC supplied from the timing controller 120. The gate driver 130 may supply the gate signal to a plurality of subpixels, included in the display panel 150, through a plurality of gate lines GL1 to GLm. The gate driver 130 may be implemented as an IC type or may be directly provided on the display panel 150 in a gate in panel (GIP) type, but is not limited thereto.

In response to the data timing control signal DDC supplied from the timing controller 120, the data driver 140 may sample and latch the data signal DATA, convert a digital data signal into an analog data voltage, based on a gamma reference voltage, and output the analog data voltage. The data driver 140 may respectively supply data voltages to the subpixels of the display panel 150 through a plurality of data lines DL1 to DLn. The data driver 140 may be implemented as an IC type or may be mounted on the display panel 150 or a PCB, but is not limited thereto.

The power supply 180 may generate a high level voltage and a low level voltage, based on an external input voltage supplied from the outside, and may output the high level voltage and the low level voltage through a high level power line EVDD and a low level power line EVSS. The power supply 180 may generate and output a voltage (for example, a gate high voltage and a gate low voltage) needed for driving of the gate driver 130 or a voltage needed for driving of the data driver 140, in addition to the high level voltage and the low level voltage.

The display panel 150 may display an image (video), based a driving voltage including on the high level voltage and the low level voltage, and a driving signal including the gate signal and a data voltage. The subpixels of the display panel 150 may each self-emit light. The display panel 150 may be manufactured based on a substrate, having stiffness or flexibility, such as glass, silicon, or polyimide. Also, the subpixels emitting light may include pixels including red, green, and blue, or may include pixels including red, green, blue, and white.

For example, one subpixel SP may be connected to a first data line DL1, a first gate line GL1, the high level power line EVDD, and the low level power line EVSS and may include a switching transistor, a driving transistor, a capacitor, and an organic light emitting diode. The subpixel SP used in the light emitting display apparatus may self-emit light and may be complicated in configuration of a circuit. Also, in addition to the organic light emitting diode emitting light, a compensation circuit compensating for a degradation in a driving transistor supplying a driving current needed for driving of the organic light emitting diode may be variously implemented. Accordingly, the subpixel SP is simply illustrated in the form of blocks.

In the above description, each of the timing controller 120, the gate driver 130, and the data driver 140 has been described as an individual element. However, based on an implementation type of the light emitting display apparatus, one or more of the timing controller 120, the gate driver 130, and the data driver 140 may be integrated into one IC.

Figure 3:
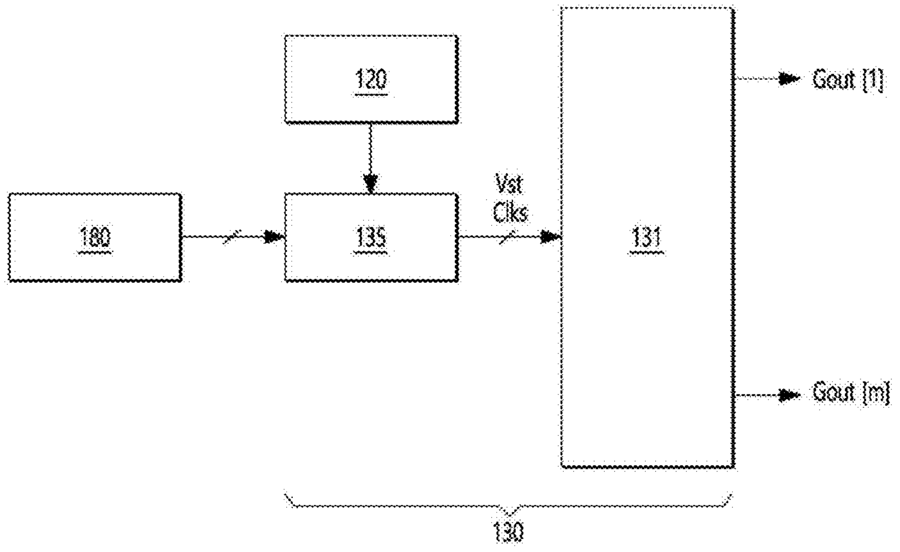
FIGS. 3 and 4 are diagrams for describing a configuration of a gate driver of a gate in panel (GIP) type.
Figure 4:
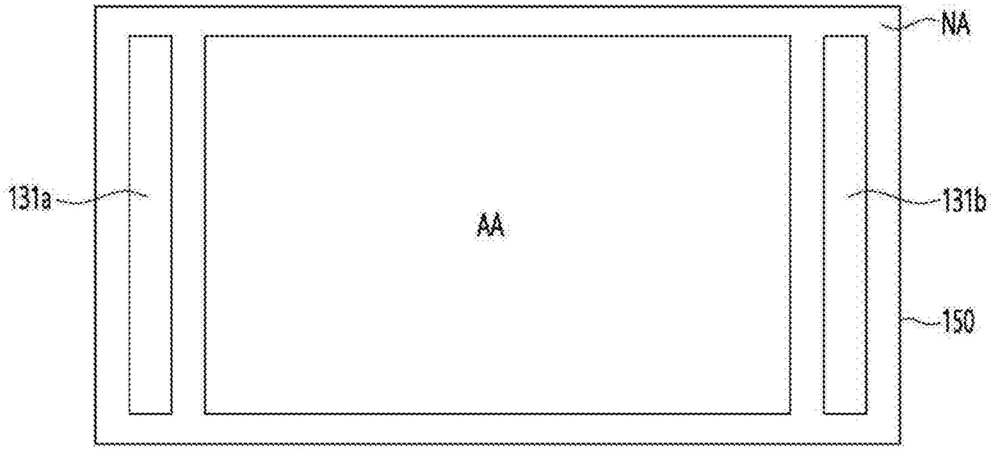

FIGS. 3 and 4 are diagrams for describing a configuration of a gate driver of a GIP type.

As illustrated in FIG. 3, a GIP-type gate driver 130 may include a shift register 131 and a level shifter 135. The level shifter 135 may generate clock signals Clks and a start signal Vst, based on signals and voltages output from the timing controller 120 and the power supply 180.

The clock signals Clks may be output through clock signal lines, and the start signal Vst may be output through a start signal line. The shift register 131 may operate based on the clock signals Clks and the start signal Vst and may output gate signals Gout[1] to Gout[m].

As illustrated in FIG. 4, in a GIP-type gate driver, first and second shift registers 131*a* and 131*b* outputting gate signals may be disposed in left and right non-display areas NA with respect to a display area AA which displays an image by using the display panel 150. The first and second shift registers 131*a* and 131*b* may be formed as a thin film type in the display panel 150, based on a GIP type.

Figure 5:
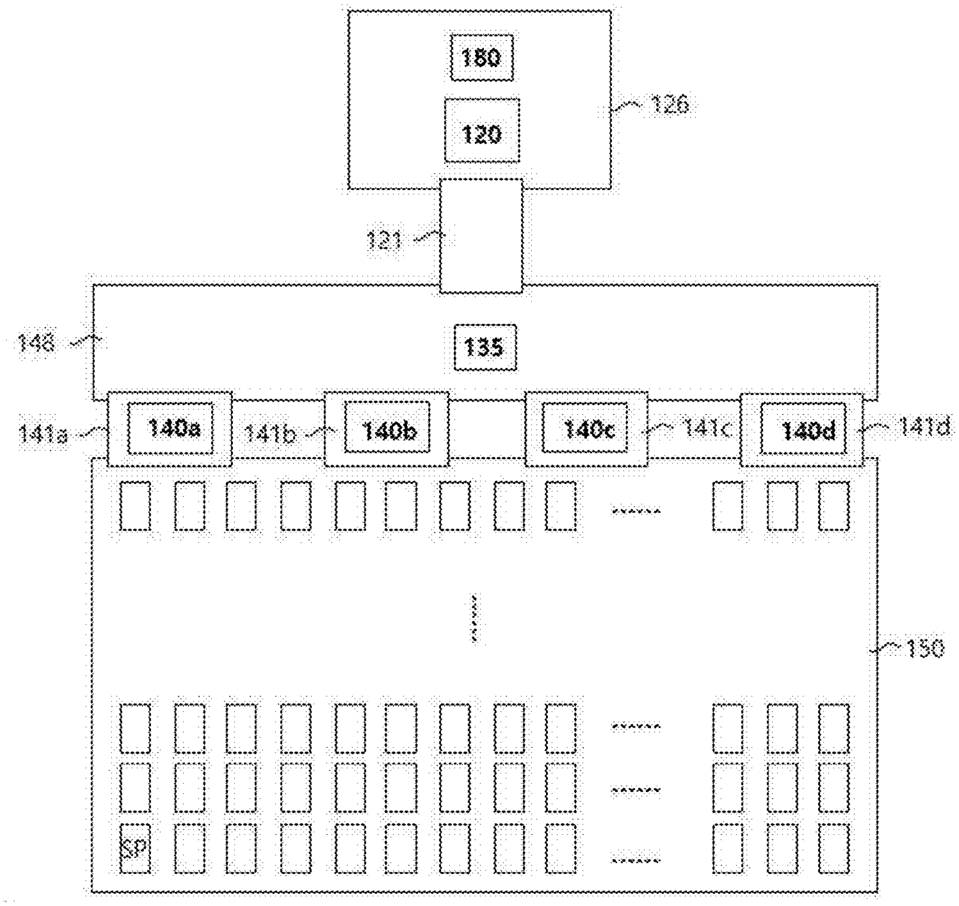
FIG. 5 is a diagram illustrating a modularized light emitting display apparatus according to a first embodiment.
Figure 6:
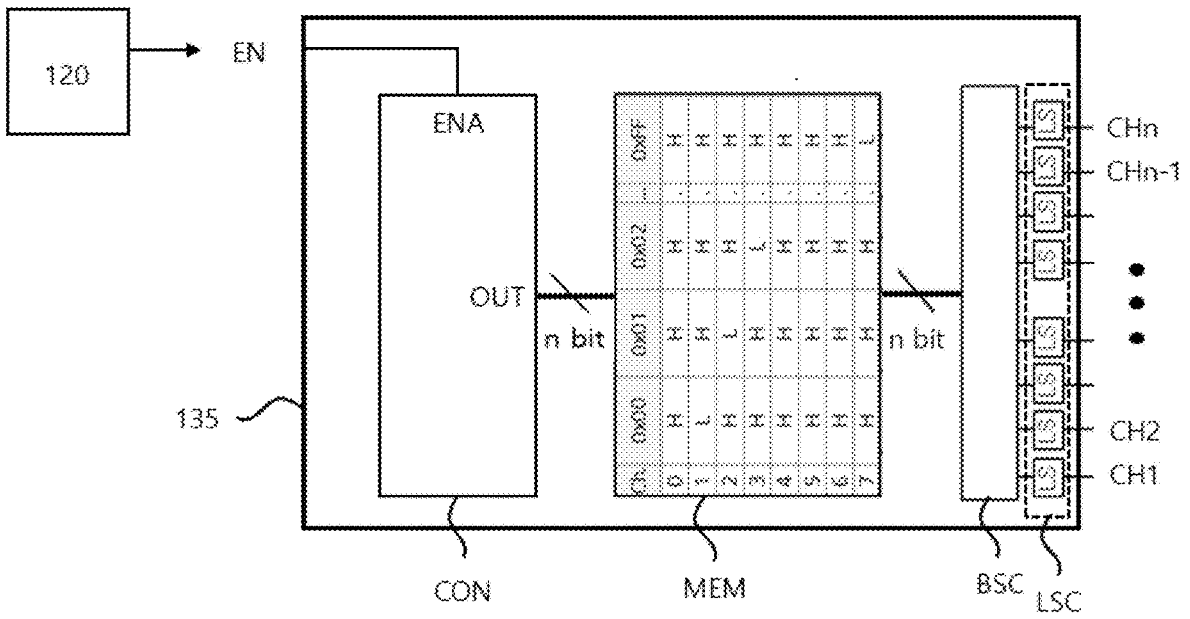
FIG. 6 is a block diagram illustrating a level shifter according to a first embodiment.
Figure 7:
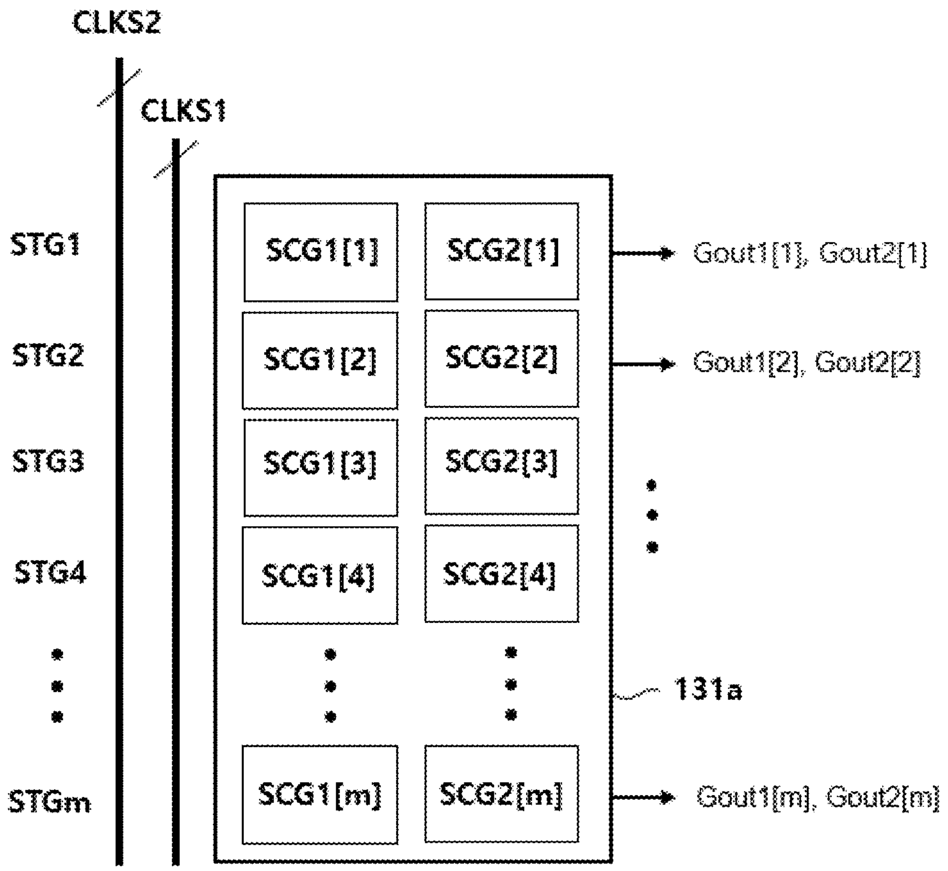
FIG. 7 is a block diagram illustrating a shift register capable of driving based on the level shifter of FIG. 6.
Figure 8:
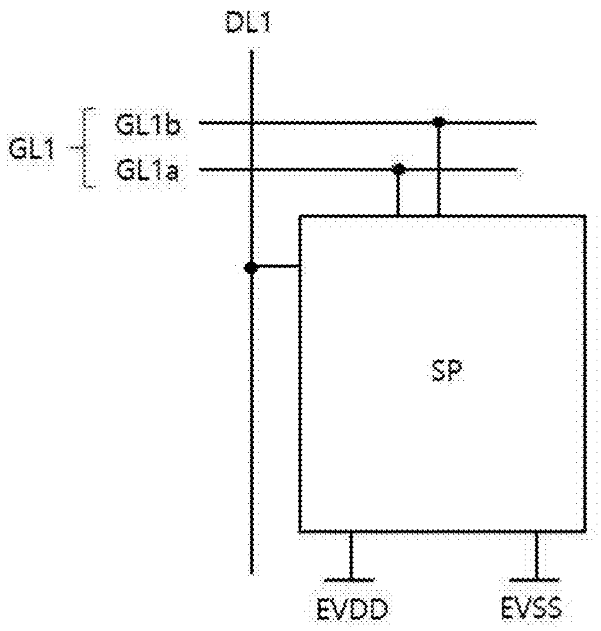
FIG. 8 is a block diagram illustrating a subpixel capable of driving based on the shift register of FIG. 7.

FIG. 5 is a diagram illustrating a modularized light emitting display apparatus according to a first embodiment, FIG. 6 is a block diagram illustrating a level shifter according to a first embodiment, FIG. 7 is a block diagram illustrating a shift register capable of driving based on the level shifter of FIG. 6, and FIG. 8 is a block diagram illustrating a subpixel capable of driving based on the shift register of FIG. 7.

As illustrated in FIG. 5, the light emitting display apparatus according to the first embodiment may be modularized based on a control board 126, a first connector 121, a source board 148, second connectors 141*a* to 141*d*, and a display panel 150. FIG. 5 may be merely for helping understand the modularized light emitting display apparatus, and an embodiment is not limited thereto.

The control board 126 may include a timing controller 120 and a power supply 180. The first connector 121 may electrically connect the control board 126 to the source board 148. The source board 148 may include a level shifter 135. The second connectors 141*a* to 141*d* may electrically connect the source board 148 to the display panel 150. The second connectors 141*a* to 141*d* may include data drivers 140*a* to 140*d*.

As illustrated in FIG. 6, the level shifter 135 according to the first embodiment may operate based on an enable signal EN output from the timing controller 120 and may output periodic signals through first to $N^{th}$ output channels CH1 to CHn. Hereinafter, for convenience of description, an example where the level shifter 135 outputs clock signals as periodic signals will be described. Also, a data map written in a memory MEM of FIG. 6 may be described for helping understanding.

The level shifter 135 may include a controller CON, a memory MEM, a bit split circuit BSC, and an output circuit LSC, for outputting clock signals based on the enable signal EN.

The memory MEM may include data where the clock signals to be applied to a shift register are stored in a sequence status. For example, the memory MEM may include a data map where logic values H or L to be differentiated and output for each of channels CH0 to CH7 for each of addresses 0x00 to 0xFF are sequentially stored.

The controller CON may operate based on the enable signal EN applied through an enable signal input terminal ENA and may extract and output data from the data map of the memory MEM, based on a signal output through a signal output terminal OUT. The bit split circuit BSC may sort a serial output signal, output from the memory MEM, so as to be divided into parallel output signals. The output circuit LSC may include a circuit LS which up-shifts and outputs a level of an output signal output from the bit split circuit BSC. The controller CON may shift an address value of the data map whenever the enable signal EN is applied to be first logic, and whenever the enable signal EN is applied to be second logic which is opposite to the first logic, the controller CON may extract, as an output signal, data included in the address value of the data map to output the output signal as periodic signals.

As illustrated in FIGS. 6 to 8, the shift register 131*a* may operate based on the clock signals output from the level shifter 135. The clock signals output from the level shifter 135 may be applied to the shift register 131*a* through clock signal lines CLKS1 and CLKS2. The clock signal lines CLKS1 and CLKS2 may each include two or more clock signal lines.

The shift register 131*a* may include first scan signal generators SCG1[1] to SCG1[m] which output first scan signals Gout1[1] to Gout1[m] and second scan signal generators SCG2[1] to SCG2[m] which output second scan signals Gout2[1] to Gout2[m]. The first scan signal generators SCG1[1] to SCG1[m] and the second scan signal generators SCG2[1] to SCG2[m] may be divisionally disposed for each of stages (for example, first to $M^{th}$ stages) STG[1] to STG[m].

The first scan signal generator SCG1[1] and the second scan signal generator SCG2[1] disposed in the first stage STG1 may respectively output the first scan signal Gout1[1] and the second scan signal Gout2[1] for driving a first gate line GL1. A $1M^{th}$ scan signal generator SCG1[m] and a $2M^{th}$ scan signal generator SCG2[m] disposed in the $M^{th}$ stage STGm may respectively output a $1M^{th}$ scan signal Gout1[m] and a $2M^{th}$ scan signal Gout2[m] for driving an $M^{th}$ gate line GLm.

Each of the first scan signal generators SCG1[1] to SCG1[m] and the second scan signal generators SCG2[1] to SCG2[m] may sequentially operate based on the clock signals output from the level shifter 135. However, this may be merely one embodiment, the first scan signal generators SCG1[1] to SCG1[m] and the second scan signal generators SCG2[1] to SCG2[m] may operate in order, in reverse order, or at random.

The subpixel SP may be connected to the first gate line GL1 including a first scan line GL1*a* and a second scan line GL1*b*, a first data line DL1, a high level power line EVDD, and a low level power line EVSS. The subpixel SP may store a data voltage in response to the first scan signal Gout1[1] applied through the first scan line GL1*a* and may perform a sensing operation or an emission operation in response to the second scan signal Gout2[1] applied through the second scan line GL1*b*. However, this may be merely one embodiment, and an embodiment is not limited thereto.

Furthermore, the shift register 131*a* may further include dummy signal generators which output a dummy gate signal to a previous end with respect to the first scan signal generator SCG1[1] and the second scan signal generator SCG2[1] and a next end with respect to the $1M^{th}$ scan signal generator SCG1[m] and the $2M^{th}$ scan signal generator SCG2[m], but the illustration thereof may be omitted.

Furthermore, in FIG. 6, an example where an n-bit signal is output from the controller CON and the memory MEM is illustrated and described. Hereinafter, however, an example where eight clock signals are capable of being output based on an 8-bit output signal will be described for example.

Figure 9:
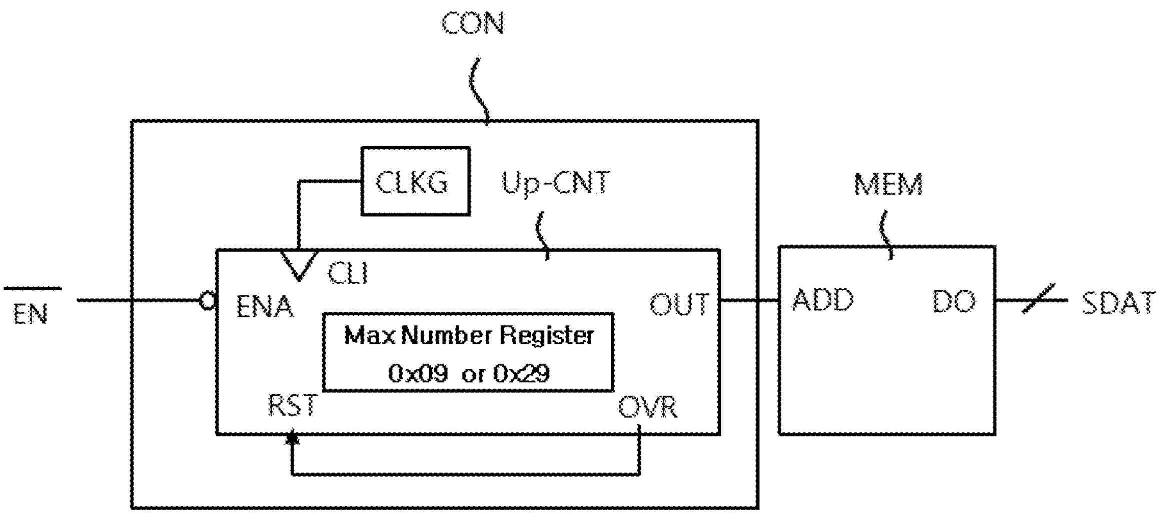
FIGS. 9 and 10 are diagrams illustrating in more detail elements included in a level shifter according to a first embodiment.
Figure 10:
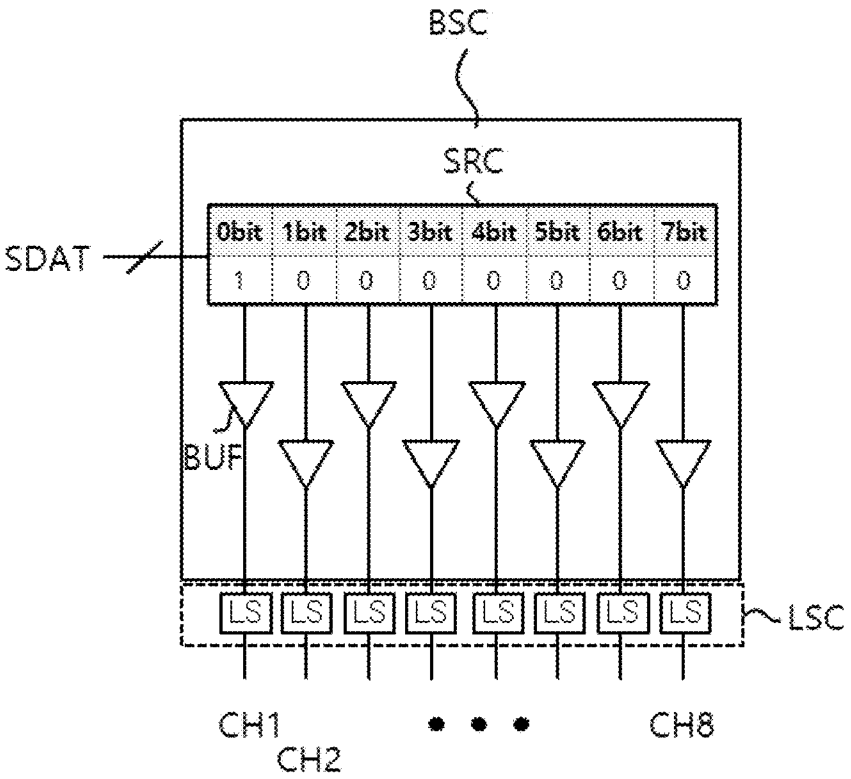

FIGS. 9 and 10 are diagrams illustrating in more detail elements included in a level shifter according to a first embodiment.

As illustrated in FIG. 9, according to the first embodiment, a controller CON included in a level shifter may include a clock generator CLKG and an up-counter Up-CNT.

The clock generator CLKG may generate a clock which is to be applied to the up-counter Up-CNT. The up-counter Up-CNT may include an enable signal input terminal ENA, a clock input terminal CL1, a count signal output terminal OUT, an overflow signal output terminal OVR, and a reset input terminal RST. The up-counter Up-CNT may be implemented as an 8-bit up-counter.

The up-counter Up-CNT may generate a count signal which increases based on a clock output from the clock generator CLKG. The up-counter Up-CNT may activate or deactivate a count operation, based on an enable signal EN applied to the enable signal input terminal ENA. For example, the up-counter Up-CNT may activate the count operation when the enable signal EN corresponding to low logic is applied thereto.

For example, the up-counter Up-CNT may include a maximum number register corresponding to 0x09 or 0x29. The up-counter Up-CNT may start a count from 0x00, and when a counted number is more than a maximum counted number corresponding to 0x09 or 0x29, the up-counter Up-CNT may output an overflow signal through the overflow signal output terminal OVR. When an overflow signal is input through the reset input terminal RST, the up-counter Up-CNT may reset a count signal to return to 0x00.

When the count signal is output from the up-counter Up-CNT of the controller CON, the memory MEM may extract and output data corresponding thereto from the data map. The memory MEM may include an input terminal ADD to which the count signal is applied and an output terminal DO through which an output signal SDAT is output. A process of outputting a clock signal from the level shifter will be described below with reference to FIGS. 11 and 12.

As illustrated in FIG. 10, according to the first embodiment, the bit split circuit BSC included in the level shifter may include a shift register SRC and a buffer BUF.

The shift register SRC may divide a serial output signal SDAT, output from the memory MEM, into parallel output signals, based on a bit split operation. The buffer BUF may transfer an output signal, output from the shift register SRC, to the output circuit LSC. The output circuit LSC may up-shift and output a level of the output signal output through the buffer BUF.

Furthermore, FIG. 10 illustrates a state of when the shift register SRC outputs high logic corresponding to 1 through a first channel CH1 and outputs low logic corresponding to 0 through second to eighth channels CH2 to CH8.

Hereinafter, a process of outputting clock signals from the level shifter under a condition where clock signals to be applied to the first scan signal generators SCG1[1] to SCG1[m] and the second scan signal generators SCG2[1] to SCG2[m] illustrated in FIG. 7 are limited to five channels will be additionally described.

Figure 11:
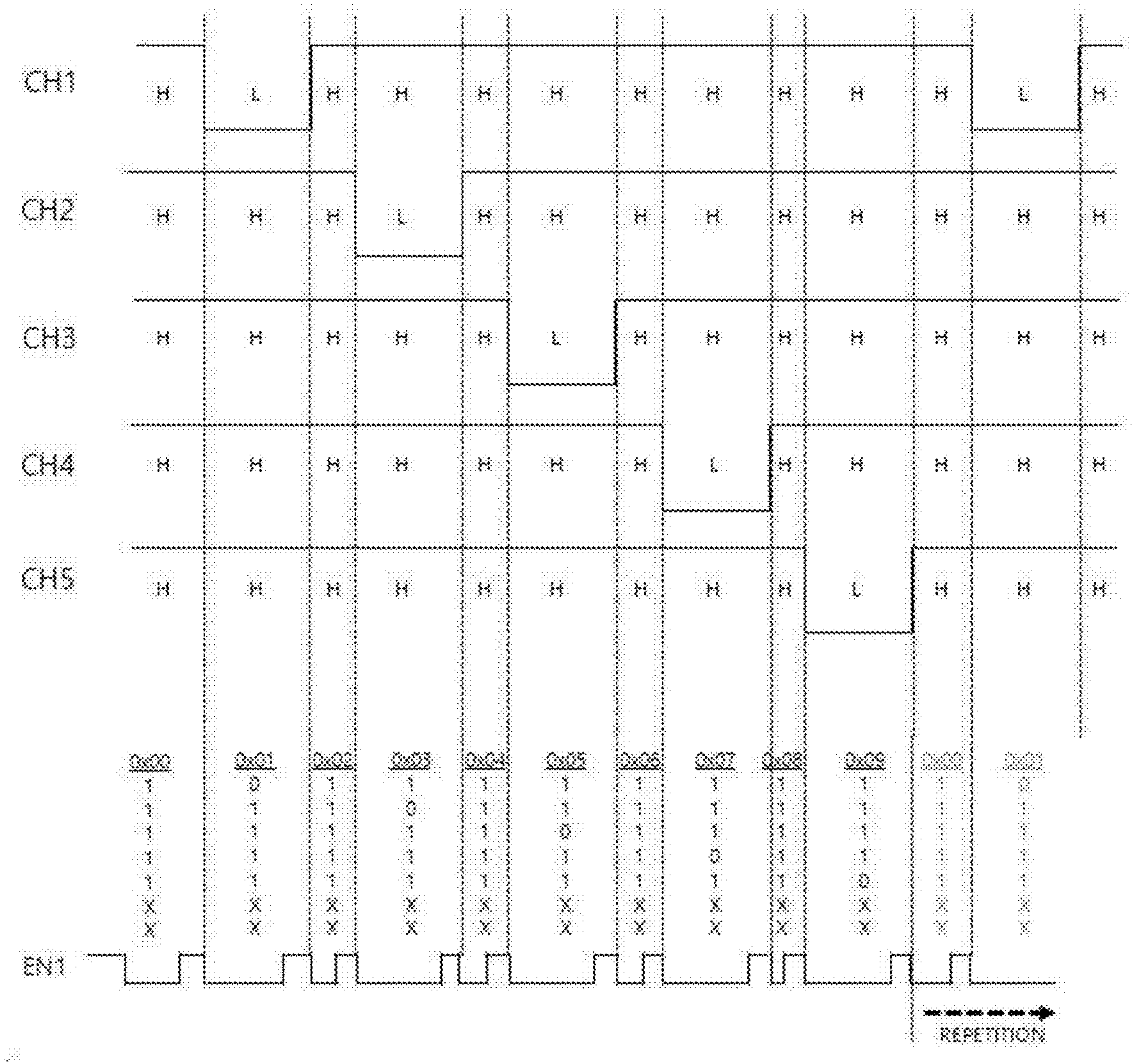
FIG. 11 is a diagram illustrating a process of outputting first clock signals from a level shifter.
Figure 12:
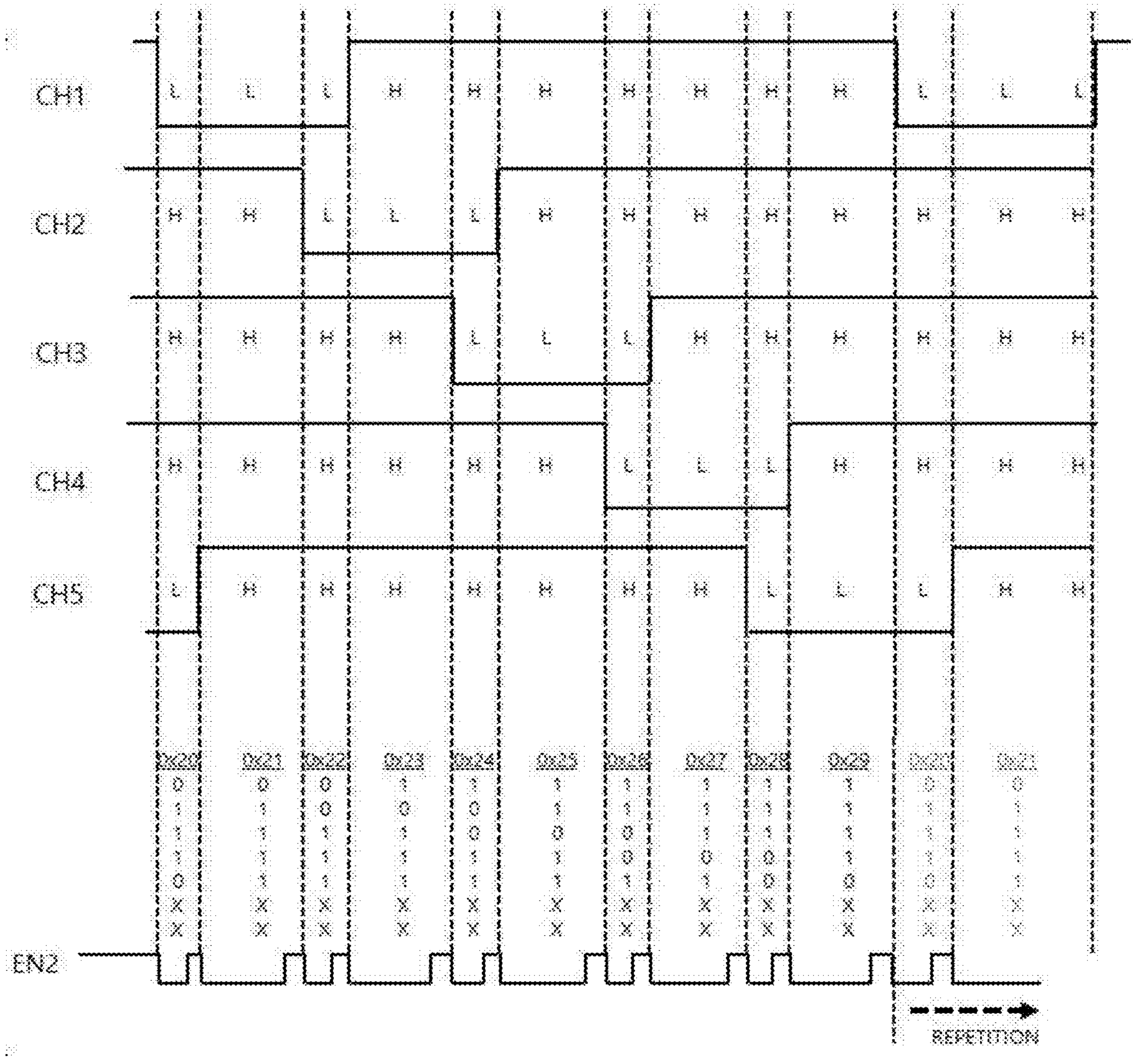
FIG. 12 is a diagram illustrating a process of outputting second clock signals from the level shifter.

FIG. 11 is a diagram illustrating a process of outputting first clock signals from a level shifter, and FIG. 12 is a diagram illustrating a process of outputting second clock signals from the level shifter.

As illustrated in FIGS. 9, 10, and 11, in an up-counter Up-CNT of the level shifter, a maximum number register (Max Number Register) may be selected as a first address value "0x00 to 0x09" so as to output first clock signals CLKS1 which are to be applied to the first scan signal generators SCG1[1] to SCG1[m] illustrated in FIG. 7.

First, when a first enable signal EN1 having low logic is applied to the level shifter, an address of 0x00 may be selected in the data map of the memory MEM. At this time, because 11111XX is recorded in a corresponding address, a clock signal having high logic H may be output to the first to fifth channels CH1 to CH5 of the level shifter. Here, XX may represent that there is no output (output not used) for providing an example where only total five channels are used.

Subsequently, when the first enable signal EN1 having low logic is applied after high logic is applied to the level shifter, an address of 0x01 may be selected in the data map of the memory MEM. At this time, because 01111XX is recorded in a corresponding address, a clock signal having low logic L may be output to the first channel CH1, and a clock signal having high logic H may be output to the second to fifth channels CH2 to CH5.

The level shifter may operate in this order, and then, after an address of 0x09 is selected in the data map of the memory MEM, an overflow signal may be generated. The level shifter may reset a count value to an address of 0x00, based on the overflow signal. Accordingly, the level shifter may operate based on the above-described flow and may repeatedly output clock signals included in an address of 0x00 to an address of 0x09. For example, a first clock signal output through the first channel CH1 may be applied through a first clock signal line, and a second clock signal output through the second channel CH2 may be applied through a second clock signal line. In this manner, clock signals output through the third to fifth channels CH3 to CH5 may be respectively output through third to fifth clock signal lines.

As illustrated in FIGS. 9, 10, and 12, in an up-counter Up-CNT of the level shifter, a maximum number register (Max Number Register) may be selected as a second address value "0x20 to 0x29" so as to output second clock signals CLKS2 which are to be applied to the second scan signal generators SCG2[1] to SCG2[m] illustrated in FIG. 7.

First, when a second enable signal EN2 having low logic is applied to the level shifter, an address of 0x20 may be selected in the data map of the memory MEM. At this time, because 01110XX is recorded in a corresponding address, a clock signal having high logic H may be output to the second to fourth channels CH2 to CH4 of the level shifter, and a clock signal having low logic L may be output to the first channel CH1 and the fifth channel CH5 of the level shifter. Here, XX may represent that there is no output (output not used) for providing an example where only total five channels are used.

Subsequently, when the second enable signal EN2 having low logic is applied after high logic is applied to the level shifter, an address of 0x21 may be selected in the data map of the memory MEM. At this time, because 01111XX is recorded in a corresponding address, a clock signal having low logic L may be output to the first channel CH1, and a clock signal having high logic H may be output to the second to fifth channels CH2 to CH5.

The level shifter may operate in this order, and then, after an address of 0x29 is selected in the data map of the memory MEM, the overflow signal may be generated. The level shifter may reset a count value to an address of 0x20, based on the overflow signal. Accordingly, the level shifter may operate based on the above-described flow and may repeatedly output clock signals included in an address of 0x20 to an address of 0x29.

Figure 13:
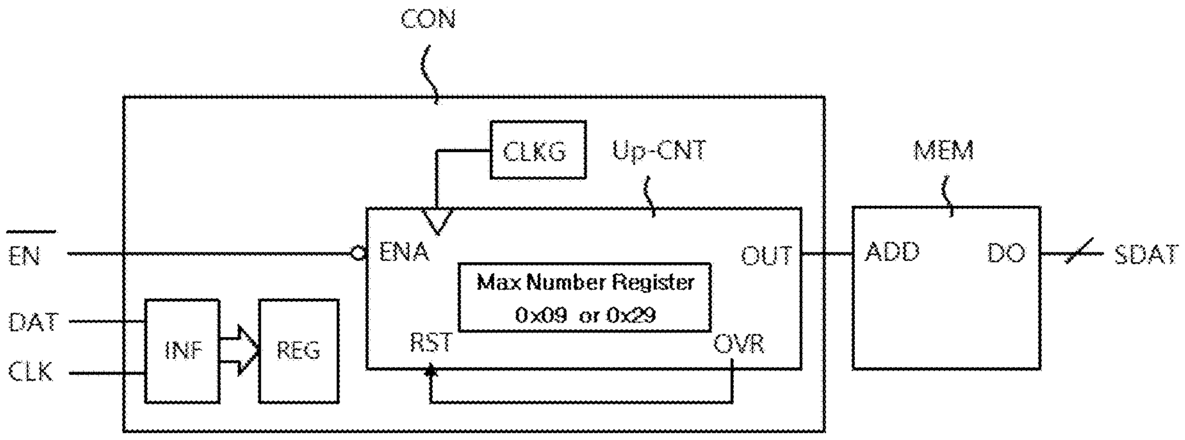
FIG. 13 is a diagram illustrating in more detail elements included in a controller according to a modification embodiment of the first embodiment.

FIG. 13 is a diagram illustrating in more detail elements included in a controller according to a modification embodiment of the first embodiment.

As illustrated in FIG. 13, according to the modification embodiment of the first embodiment, a controller CON of a level shifter may further include an interface INF and a register REG. The controller CON according to the modification embodiment of the first embodiment may perform bidirectional data communication with a timing controller, based on the interface INF. To this end, communication data DAT and a communication clock CLK may be input to the interface INF. The register REG may store a current status of a device (for example, an up-counter and a memory) included in the level shifter.

Accordingly, according to the modification embodiment of the first embodiment, the level shifter may monitor a driving status, based on mutual communication with the timing controller, and moreover, an output condition may be changed. That is, an input/output of the level shifter may be controlled by the timing controller.

Figure 14:
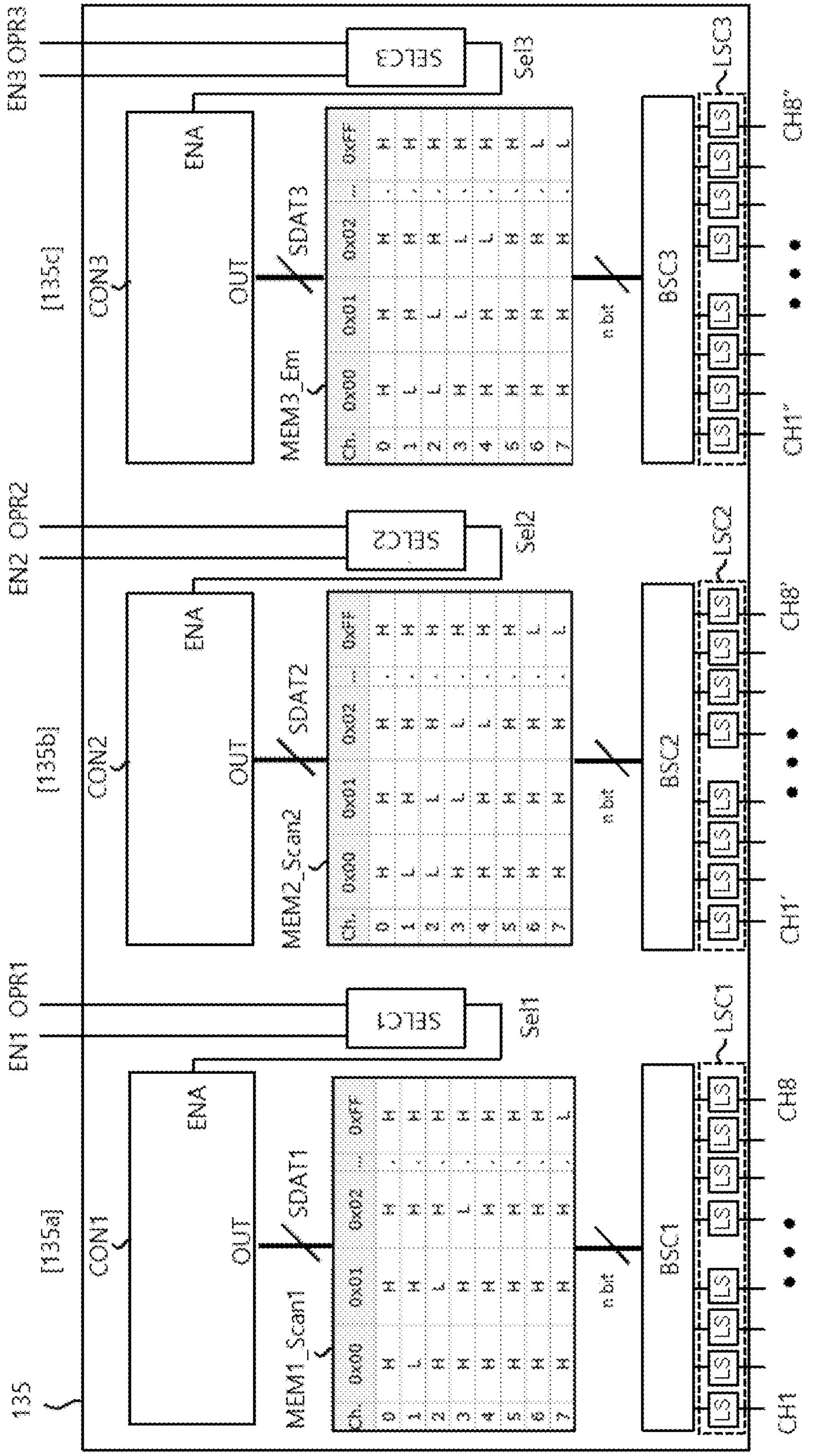
FIG. 14 is a block diagram illustrating a level shifter according to a second embodiment.
Figure 15:
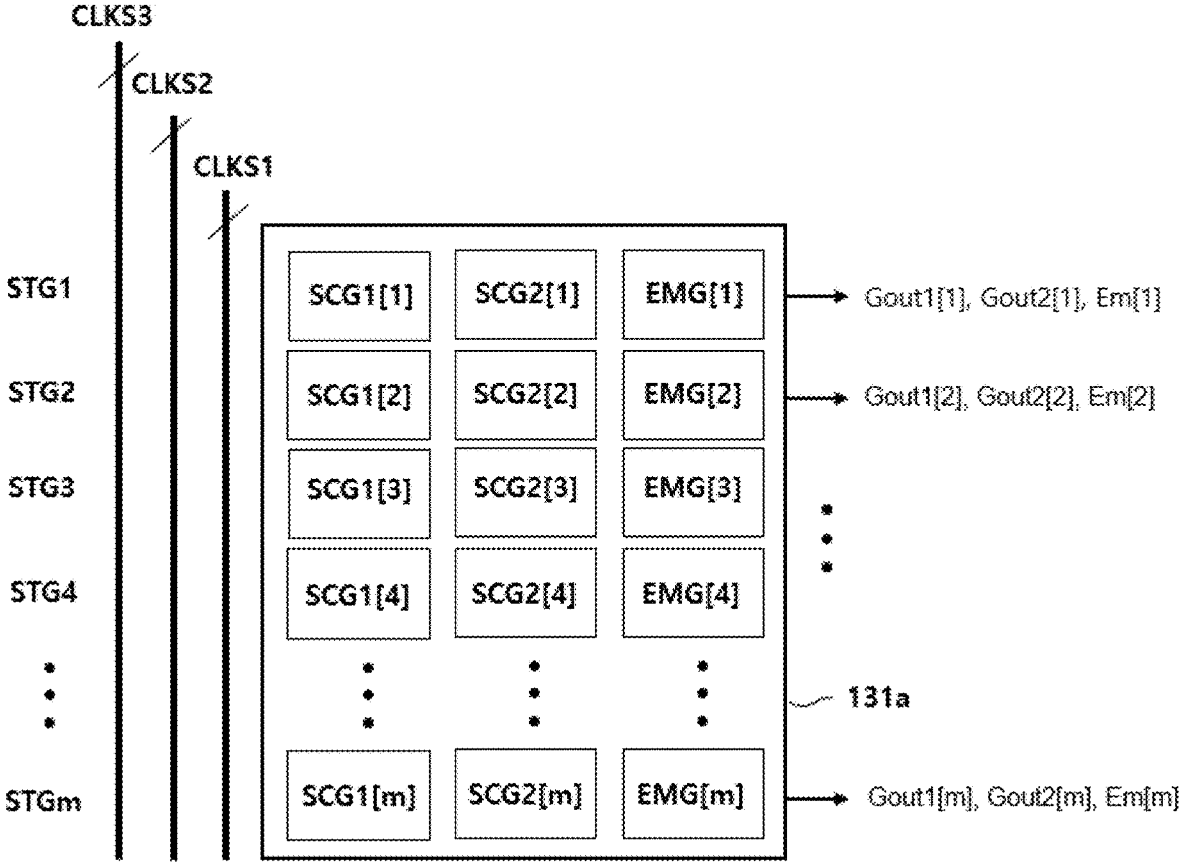
FIG. 15 is a block diagram illustrating a shift register capable of driving based on the level shifter of FIG. 14.
Figure 16:
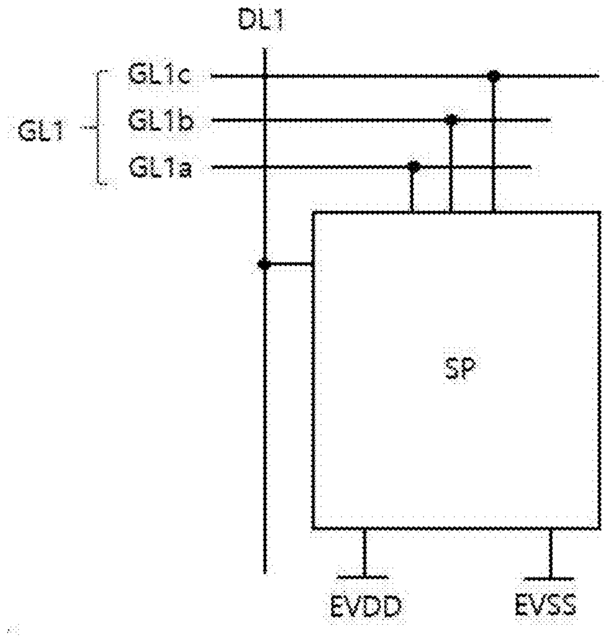
FIG. 16 is a block diagram illustrating a subpixel capable of driving based on the shift register of FIG. 15.

FIG. 14 is a block diagram illustrating a level shifter according to a second embodiment, FIG. 15 is a block diagram illustrating a shift register capable of driving based on the level shifter of FIG. 14, and FIG. 16 is a block diagram illustrating a subpixel capable of driving based on the shift register of FIG. 15.

As illustrated in FIG. 14, a level shifter 135 according to the second embodiment may operate based on enable signals EN1 to EN3 and driving selection signals OPR1 to OPR3 output from a timing controller 120 and may respectively output periodic signals through output channels CH1 to CH8, CH1' to CH8', and CH1" to CH8." Hereinafter, for convenience of description, an example where the level shifter 135 outputs clock signals as periodic signals will be described. Also, a data map written in a first memory MEM1 of FIG. 14 may be described for helping understanding.

The level shifter 135 may include first to third clock signal generators 135*a* to 135*c*. The first to third clock signal generators 135*a* to 135*c* may respectively include selectors SELC1 to SELC3, controllers CON1 to CON3, memories MEM1 to MEM3, bit split circuits BSC1 to BSC3, and output circuits LSC1 to LSC3, so as to output clock signals based on the enable signals EN1 to EN3 and the driving selection signals OPR1 to OPR3.

The selectors SELC1 to SELC3 may generate selection signals Sel1 to Sel3 for selecting operation conditions of the controllers CON1 to CON3, based on the enable signals EN1 to EN3 and the driving selection signals OPR1 to OPR3.

The memories MEM1 to MEM3 may include data where the clock signals to be applied to a shift register are stored in a sequence status. For example, the memories MEM1 to MEM3 may include a data map where logic values H or L to be differentiated and output for each of channels CH0 to CH7 for each of addresses 0x00 to 0×FF are sequentially stored.

The controllers CON1 to CON3 may operate based on the enable signals EN1 to EN3 and may extract and output data from the data maps of the memories MEM1 to MEM3. The bit split circuits BSC1 to BSC3 may sort serial output signals, output from the memories MEM1 to MEM3, so as to be divided into parallel output signals. The output circuits LSC1 to LSC3 may up-shift and output levels of output signals output from the bit split circuits BSC1 to BSC3.

As illustrated in FIGS. 14 to 16, the shift register 131*a* may operate based on the clock signals output from the level shifter 135. The clock signals output from the level shifter 135 may be applied to the shift register 131*a* through clock signal lines CLKS1 to CLKS3.

The shift register 131*a* may include first scan signal generators SCG1[1] to SCG1[m] which output first scan signals Gout1[1] to Gout1[m], second scan signal generators SCG2[1] to SCG2[m] which output second scan signals Gout2[1] to Gout2[m], and third scan signal generators EMG[1] to EMG[m] which output third scan signals Em[1] to Em[m]. Accordingly, it may be defined that a first memory MEM1 includes a first scan signal generating data map MEM1_Scan1, a second memory MEM2 includes a second scan signal generating data map MEM2_Scan2, and a third memory MEM3 includes a third scan signal generating data map MEM3_Em.

The first scan signal generators SCG1[1] to SCG1[m], the second scan signal generators SCG2[1] to SCG2[m], and the third scan signal generators EMG[1] to EMG[m] may be divisionally disposed for each of stages STG[1] to STG[m]. The first scan signal generator SCG1[1], the second scan signal generator SCG2[1], and the third scan signal generator EMG[1] disposed in the first stage STG1 may respectively output the first scan signal Gout1[1], the second scan signal Gout2[1], and the third scan signal Em[1] for driving a first gate line GL1. A 1M$^{th}$ scan signal generator SCG1[m], a 2M$^{th}$ scan signal generator SCG2[m], and a 3M$^{th}$ scan signal generator EMG[m] disposed in the M$^{th}$ stage STGm may respectively output a 1M$^{th}$ scan signal Gout1[m], a 2M$^{th}$ scan signal Gout2[m], and a 3M$^{th}$ scan signal Em[m] for driving an M$^{th}$ gate line GLm.

Each of the first scan signal generators SCG1[1] to SCG1[m], the second scan signal generators SCG2[1] to SCG2[m], and the third scan signal generators EMG[1] to EMG[m] may sequentially operate based on the clock signals output from the level shifter 135. However, this may be merely one embodiment, the first scan signal generators SCG1[1] to SCG1[m], the second scan signal generators SCG2[1] to SCG2[m], and the third scan signal generators EMG[1] to EMG[m] may operate in order, in reverse order, or at random.

The subpixel SP may be connected to the first gate line GL1 including a first scan line GL1*a*, a second scan line GL1*b*, and a third scan line GLc, a first data line DL1, a high level power line EVDD, and a low level power line EVSS. The subpixel SP may store a data voltage in response to the first scan signal Gout1[1] applied through the first scan line GL1*a*, may perform a sensing operation (or a compensation operation) in response to the second scan signal Gout2[1] applied through the second scan line GL1*b*, and may perform an emission operation in response to the third scan signal Em[1]. However, this may be merely one embodiment, and an embodiment is not limited thereto.

Furthermore, the shift register 131*a* may further include dummy signal generators which output a dummy gate signal to a previous end with respect to the first scan signal generator SCG1[1], the second scan signal generator SCG2[1], and the third scan signal generator EMG[1] and a next end with respect to the 1M$^{th}$ scan signal generator SCG1[m], the 2M$^{th}$ scan signal generator SCG2[m], and the 3M$^{th}$ scan signal generator EMG[m], but the illustration thereof may be omitted.

Furthermore, in FIG. 14, an example where an n-bit signal is output from the controllers CON1 to CON3 and the memories MEM1 to MEM3 is illustrated and described. Hereinafter, however, an example where eight clock signals are capable of being output based on an 8-bit output signal will be described for example.

Moreover, the first to third clock signal generators 135*a* to 135*c* included in the level shifter 135 may include the same elements. Hereinafter, therefore, the first clock signal generator 135*a* will be described for example.

Figure 17:
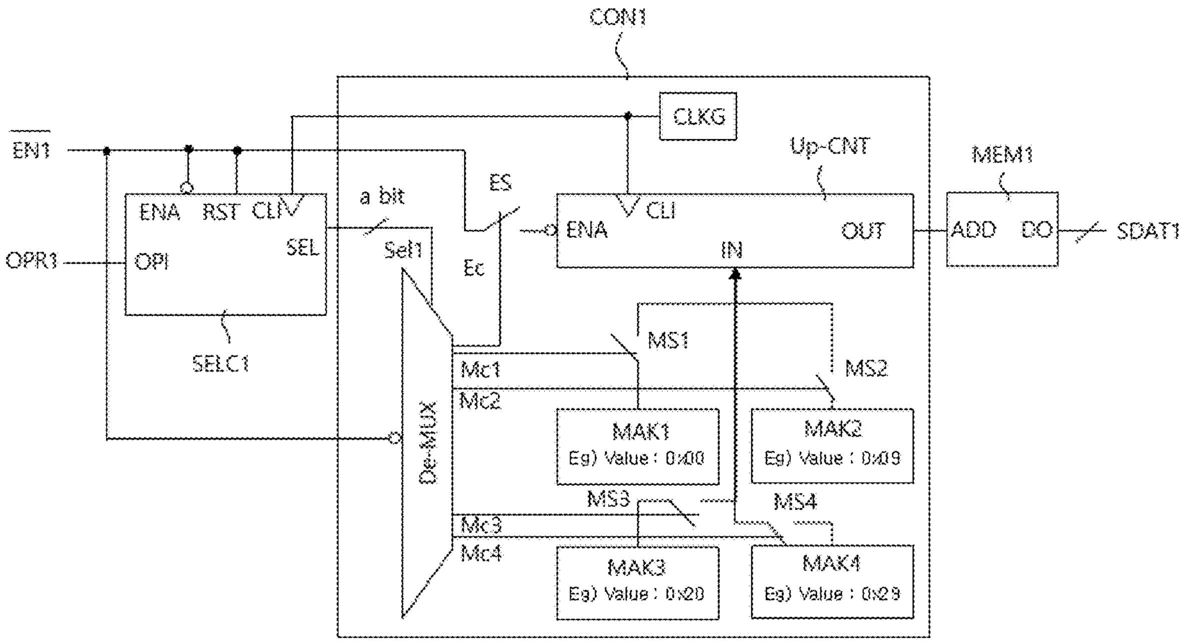
FIGS. 17 and 18 are diagrams illustrating in more detail elements included in a level shifter according to a second embodiment.
Figure 18:
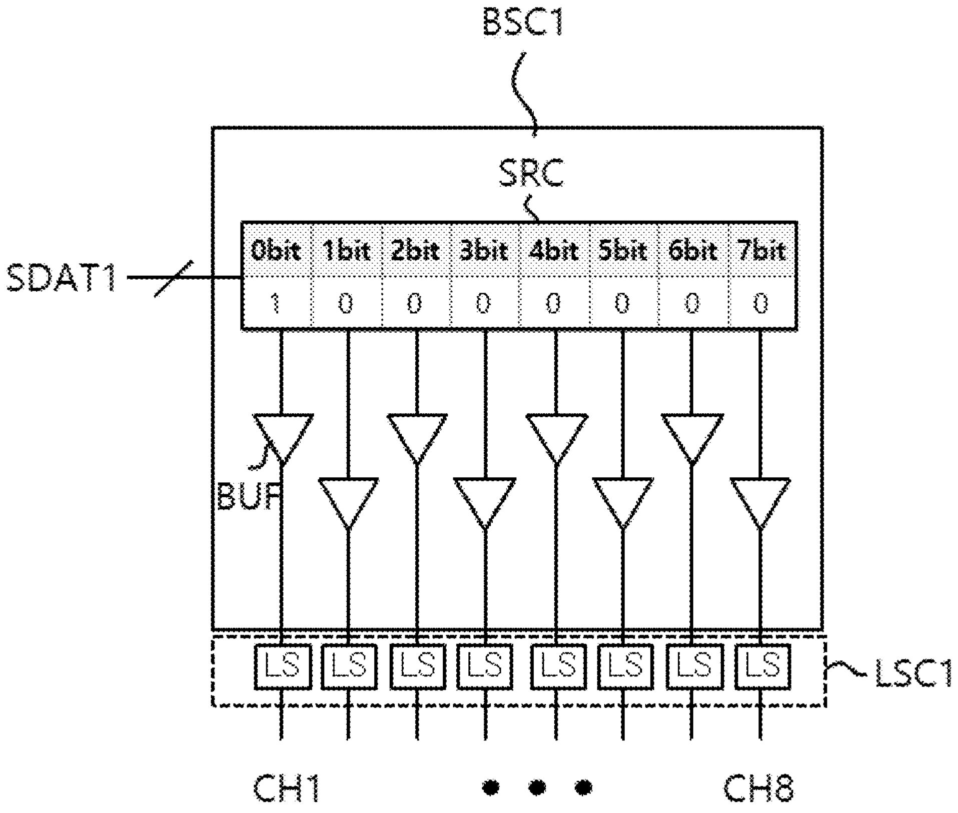

FIGS. 17 and 18 are diagrams illustrating in more detail elements included in a level shifter according to a second embodiment.

As illustrated in FIG. 17, according to the second embodiment, a first selector SELC1 included in a level shifter may generate a first selection signal Sel1 for selecting an operation condition of a first controller CON1, based on a first enable signal EN1 and a first driving selection signal OPR1.

The first selector SELC1 may be implemented as an 'a'-bit edge counter. For example, 'a' may be an integer of 3 or more. In this case, the first selector SELC1 may be implemented as a 3-bit edge counter. The first selector SELC1 may include an enable signal input terminal ENA, a reset input terminal RST, a clock input terminal CL1, a driving selection signal input terminal OP1, and a selection signal output terminal SEL.

The first selector SELC1 may generate a count signal which increases based on a clock output from a clock generator CLKG. When the enable signal EN corresponding to low logic is applied to the first selector SELC1, the first selector SELC1 may start a count operation. The first selector SELC1 may start or stop the count operation, based on the enable signal EN applied to the enable signal input terminal ENA. The first selector SELC1 may reset the count operation, based on the enable signal EN applied to the reset input terminal RST. The first selector SELC1 may change a bit value of the first selection signal Sel1 which is to be output through the selection signal output terminal SEL, based on the first driving selection signal OPR1 applied to the driving selection signal input terminal OP1.

According to the second embodiment, the first controller CON1 included in the level shifter may include a clock generator CLKG, an up-counter Up-CNT, an enable switch ES, a de-multiplexer De-MUX, markers MAK1 to MAK4, and marker switches MS1 to MS4.

The clock generator CLKG may generate a clock which is to be applied to the first selector SELC1 and the up-counter Up-CNT. The up-counter Up-CNT may include an enable signal input terminal ENA, a clock input terminal CL1, a count signal output terminal OUT, and an address signal input terminal MIN. The up-counter Up-CNT may be implemented as an 8-bit up-counter.

The enable switch ES may be turned on or off based on an enable control signal Ec output from the de-multiplexer De-MUX. The up-counter Up-CNT may generate a count signal which increases based on a clock output from the clock generator CLKG. The up-counter Up-CNT may activate or deactivate a count operation, based on the enable signal EN applied to the enable signal input terminal ENA. When the enable signal EN corresponding to low logic is applied to the enable switch ES, the up-counter Up-CNT may activate the count operation. That is, the up-counter Up-CNT may start a count at the same time with the first selector SELC1, or may not start.

When the enable signal EN corresponding to high logic is applied, the de-multiplexer De-MUX may output the enable control signal Ec and marker control signals Mc1 to Mc4, based on a bit value of the first selection signal Sel1. The marker control signal may be applied as a pulse type when the enable signal EN is applied to be a first logic.

The markers MAK1 to MAK4 may respectively include a first address value (Value: 0x00), a second address value (Value: 0x09), a third address value (Value: 0x20), and a fourth address value (Value: 0x29). One address value may be selected by the marker switches MS1 to MS4 which are turned on based on the marker control signals Mc1 to Mc4, and the markers MAK1 to MAK4 may apply the selected address value to the address signal input terminal MIN of the up-counter Up-CNT.

For example, when the enable switch ES is turned on as the enable control signal Ec is output, the up-counter Up-CNT may activate a count operation. Also, when a first marker switch MS1 is turned on as a first marker control signal Mc1 is output, the up-counter Up-CNT may start a count from the first address value (Value: 0x00) stored in the first marker MAK1. On the other hand, when a second marker switch MS2 is turned on as a second marker control signal Mc2 is output, the up-counter Up-CNT may start a count from the second address value (Value: 0x09) stored in the second marker MAK2. On the other hand, when a third marker switch MS3 is turned on as a third marker control signal Mc3 is output, the up-counter Up-CNT may start a count from the third address value (Value: 0x20) stored in the third marker MAK3. On the other hand, when a fourth marker switch MS4 is turned on as a fourth marker control signal Mc4 is output, the up-counter Up-CNT may start a count from the fourth address value (Value: 0x29) stored in the fourth marker MAK4.

When a first count signal is output from the up-counter Up-CNT of the first controller CON1, a first memory MEM1 may extract and output data corresponding thereto from a data map. The first memory MEM1 may include an input terminal ADD to which the first count signal is applied and an output terminal DO through which a first output signal SDAT1 is output. A process of outputting a clock signal from the level shifter will be described below with reference to FIGS. 19 and 20.

As illustrated in FIG. 18, the first bit split circuit BSC1 according to the second embodiment may include a shift register SRC and a buffer BUF.

The shift register SRC may divide a serial output signal SDAT1, output from the first memory MEM1, into parallel first output signals, based on a bit split operation. The buffer BUF may transfer the first output signal, output from the shift register SRC, to the first output circuit LSC1. The first output circuit LSC1 may include a circuit LS which up-shifts and outputs a level of the first output signal output through the buffer BUF.

Furthermore, FIG. 18 illustrates a state of when the shift register SRC outputs high logic corresponding to 1 through a first channel CH1 and outputs low logic corresponding to 0 through second to eighth channels CH2 to CH8.

Hereinafter, a process of outputting clock signals from the level shifter under a condition where clock signals to be applied to the first scan signal generators SCG1[1] to SCG1[m] and the second scan signal generators SCG2[1] to SCG2[m] illustrated in FIG. 15 are limited to five channels will be additionally described.

Figure 19:
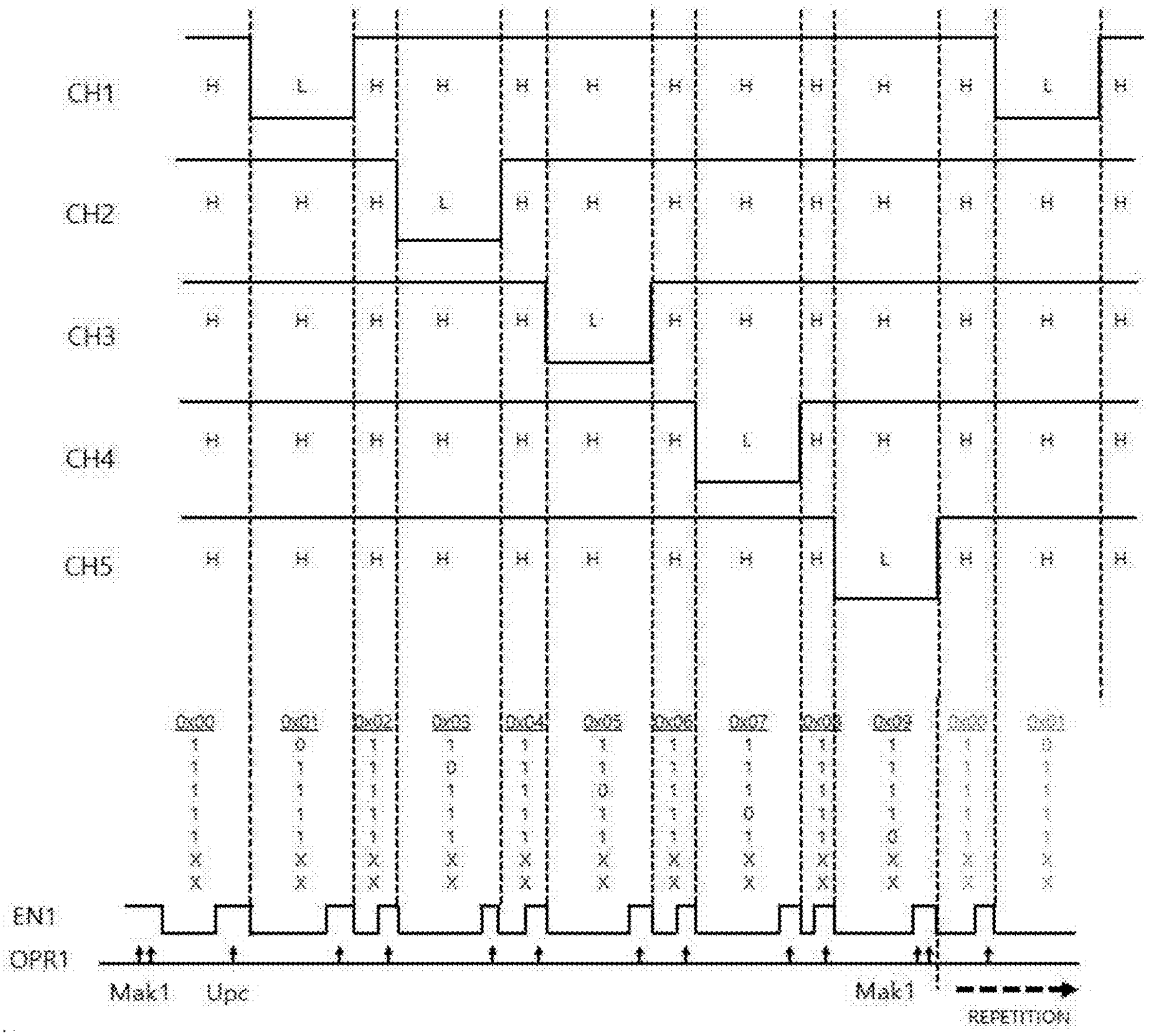
FIG. 19 is a diagram illustrating a process of outputting first clock signals from a level shifter.
Figure 20:
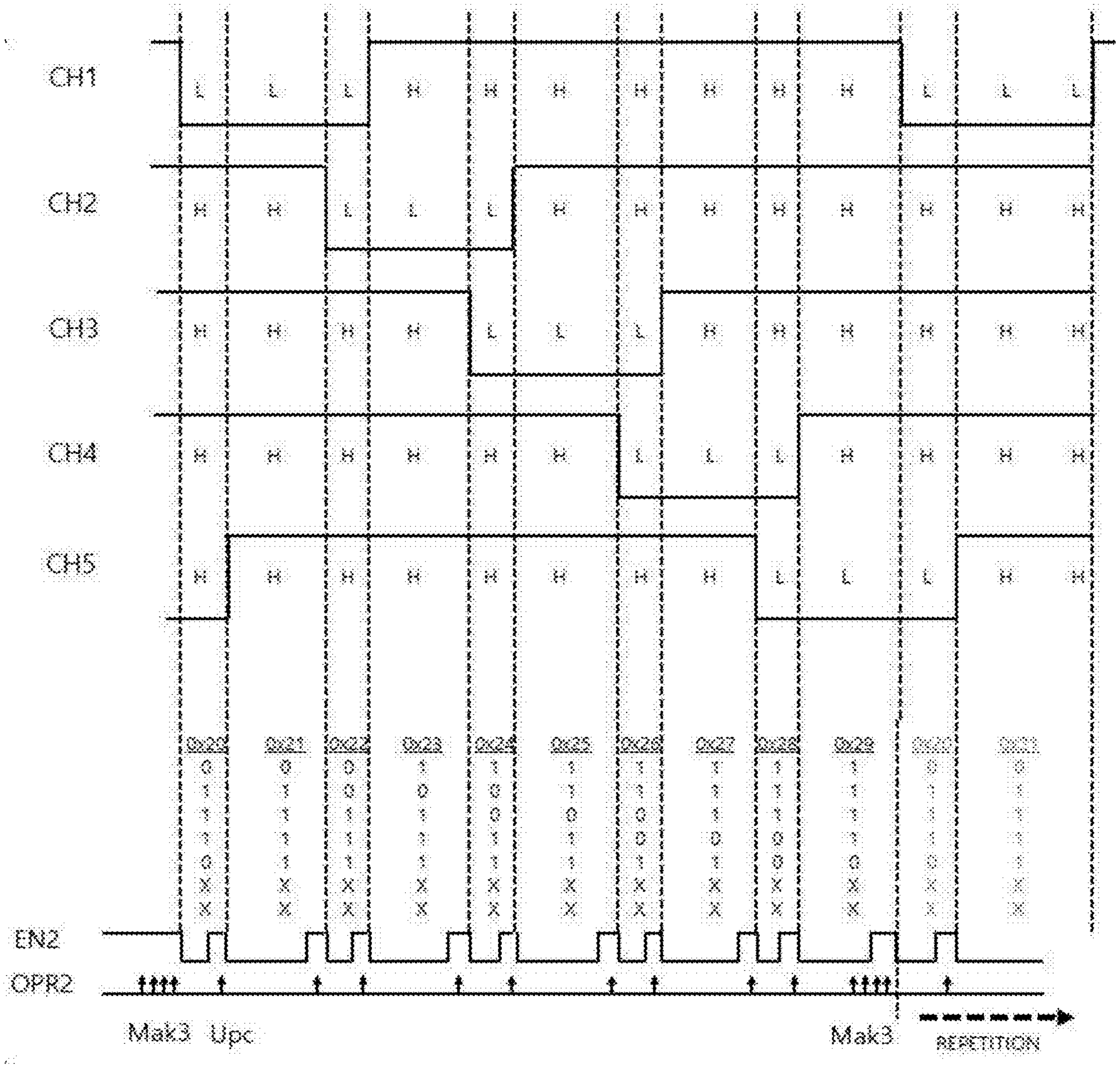
FIG. 20 is a diagram illustrating a process of outputting second clock signals from the level shifter.

FIG. 19 is a diagram illustrating a process of outputting first clock signals from a level shifter, and FIG. 20 is a diagram illustrating a process of outputting second clock signals from the level shifter.

As illustrated in FIGS. 17, 18, and 19, in an up-counter Up-CNT of the level shifter, an address value may be preferentially selected for outputting first clock signals CLKS1 which are to be applied to the first scan signal generators SCG1[1] to SCG1[m] illustrated in FIG. 15.

First, when a first marker signal Mak1 corresponding to two pulses is applied to a first driving selection signal OPR1 in a state where a first enable signal EN1 having high logic is applied, the level shifter may be set to use a first address value "0x00 to 0x09" stored in a first marker MAK1.

Subsequently, when the first enable signal EN1 having low logic is applied to the level shifter, an address of 0x00 designated by the first address value may be selected in a data map of a first memory MEM1. At this time, because 11111XX is recorded in a corresponding address, a clock signal having high logic H may be output to first to fifth channels CH1 to CH5 of the level shifter. Here, XX may represent that there is no output (output not used) for providing an example where only total five channels are used.

Subsequently, when an up-count signal Upc corresponding to one pulse is applied to the first driving selection signal OPR1 in a state where the first enable signal EN1 having high logic is applied to the level shifter, an address of 0x01 next to 0x00 may be selected in a data map of the first memory MEM1. At this time, because 01111XX is recorded in a corresponding address, a clock signal having low logic L may be output to the first channel CH1, and a clock signal having high logic H may be output to the second to fifth channels CH2 to CH5.

The level shifter may operate in this order, and then, after an address of 0x09 is selected in the data map of the first memory MEM1, the first marker signal Mak1 corresponding to two pulses is applied to the first driving selection signal OPR1. When the first marker signal Mak1 is again applied, the level shifter may reset a count value to an address of 0x00. Accordingly, the level shifter may operate based on the above-described flow and may repeatedly output clock signals included in an address of 0x00 to an address of 0x09.

As illustrated in FIGS. 17, 18, and 20, in an up-counter Up-CNT of the level shifter, an address value may be preferentially selected for outputting second clock signals CLKS2 which are to be applied to the second scan signal generators SCG2[1] to SCG2[m] illustrated in FIG. 15.

First, when a third marker signal Mak3 corresponding to four pulses is applied to a second driving selection signal OPR2 in a state where a second enable signal EN2 having high logic is applied, the level shifter may be set to use a third address value "0x20 to 0x29" stored in a third marker MAK3.

Subsequently, when the second enable signal EN2 having low logic is applied to the level shifter, an address of 0x20 designated by the third address value may be selected in a data map of a second memory MEM2. At this time, because 01110XX is recorded in a corresponding address, a clock signal having high logic H may be output to second to fourth channels CH2 to CH4 of the level shifter, and a clock signal having low logic L may be output to the first channel CH1 and the fifth channel CH5 of the level shifter.

Subsequently, when an up-count signal Upc corresponding to one pulse is applied to a second driving selection signal OPR2 in a state where the second enable signal EN2 having high logic is applied to the level shifter, an address of 0x21 next to 0x20 may be selected in the data map of the second memory MEM2. At this time, because 01111XX is recorded in a corresponding address, a clock signal having low logic L may be output to the first channel CH1, and a clock signal having high logic H may be output to the second to fifth channels CH2 to CH5.

The level shifter may operate in this order, and then, after an address of 0x29 is selected in the data map of the second memory MEM2, the third marker signal Mak3 corresponding to four pulses is applied to the second driving selection signal OPR2. When the third marker signal Mak3 is again applied, the level shifter may reset a count value to an address of 0x20. Accordingly, the level shifter may operate based on the above-described flow and may repeatedly output clock signals included in an address of 0x20 to an address of 0x29.

The level shifter according to the second embodiment may select/control an operation condition of a controller, based on an enable signal and a driving selection signal, and thus, a data map may be configured to include various sequences, thereby enhancing the general purpose. Furthermore, the data map may be configured to operate in various driving environments, and thus, the level shifter according to the second embodiment may adaptively drive the data map.

Figure 21:
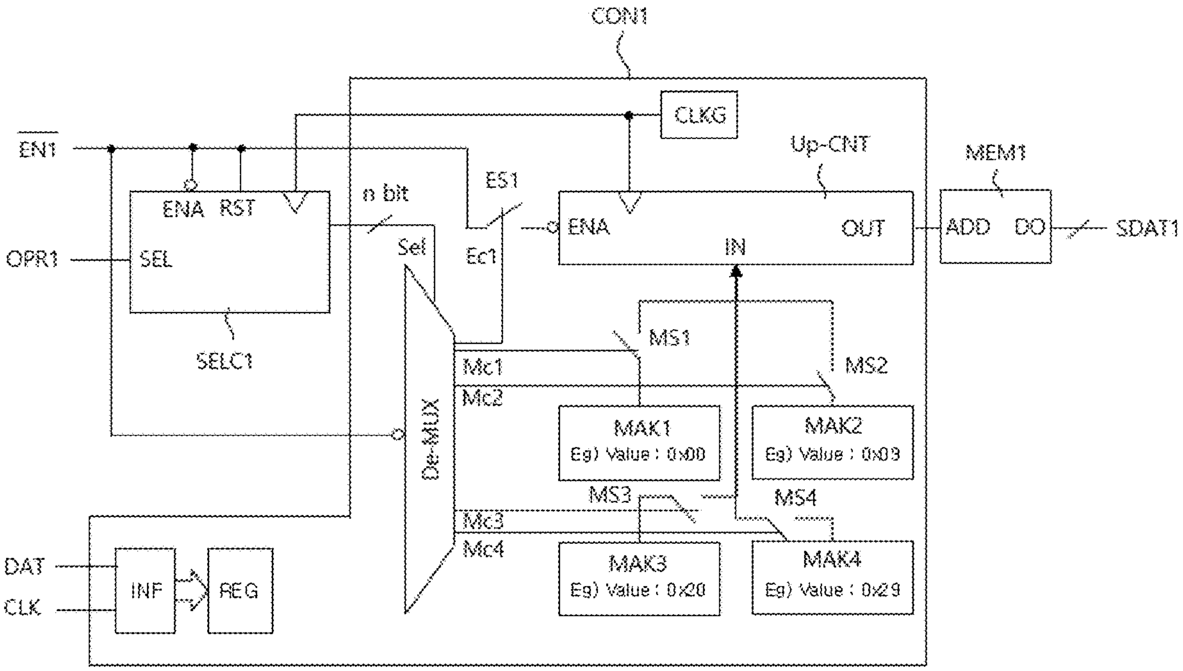
FIG. 21 is a diagram illustrating in more detail elements included in a controller according to a modification embodiment of the second embodiment.

FIG. 21 is a diagram illustrating in more detail elements included in a controller according to a modification embodiment of the second embodiment.

As illustrated in FIG. 21, according to the modification embodiment of the second embodiment, a first controller CON1 included in a level shifter may include an interface INF and a register REG. In addition to the first controller CON1, the second controller CON2 and the third controller CON3 of FIG. 14 may be equal thereto.

Accordingly, according to the modification embodiment of the second embodiment, the level shifter may monitor a driving status, based on mutual communication with the timing controller, and moreover, an output condition may be changed. That is, an input/output of the level shifter may be controlled by the timing controller.

Hereinabove, the present disclosure may generate clock signals to simplify a signal for controlling a level shifter, based on a data map (a sequence-based logic value) stored in a memory, and may also reduce the number of input pins. Also, the present disclosure may monitor a driving state of the level shifter, based on communication between a timing controller and the level shifter and may easily change and control an output condition of the level shifter to enhance the general purpose of an apparatus. Also, the present disclosure may store a marker for addressing a specific clock signal, may implement a repeated sequence by using an enable signal and a driving selection signal, and may designate an output timing.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure including the following claims.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display apparatus comprising:

a display panel configured to display an image;

a level shifter configured to obtain output data from a data map of a memory, divide an obtained serial output signal into a parallel output signal, and output periodic signals, based on an enable signal; and a shift register configured to output gate signals which are to be applied to the display panel, based on the periodic signals output from the level shifter, wherein the level shifter comprises a controller and a selector configured to generate a selection signal for selecting an operation condition of the controller, based on the enable signal and a driving selection signal, wherein the controller comprises:

a plurality of markers configured to respectively store address values differentiated from one another;

a counter configured to generate a count signal, based on the enable signal; and a de-multiplexer configured to output an enable control signal for controlling an enable switch so that the enable signal is applied to the counter and a marker control signal for turning on one of marker switches so that an address value included in one of the plurality of markers is applied to an address signal input terminal of the counter, based on the selection signal.

2. The display apparatus of claim 1, wherein:

the controller is configured to extract data from the data map of the memory, based on the enable signal; and the level shifter comprises a bit split circuit configured to divide the serial output signal into the parallel output signal.

3. The display apparatus of claim 2, wherein the controller includes a clock generator and an up-counter, wherein the clock generator is configured to generate a clock which is to be applied to the up-counter, and wherein the up-counter is configured to generate the count signal which increases based on the clock output from the clock generator.

4. The display apparatus of claim 3, wherein the up-counter is further configured to output an overflow signal through an overflow signal output terminal, and when the overflow signal is input through a reset input terminal of the up-counter, the up-counter resets the count signal.

5. The display apparatus of claim 2, wherein the level shifter further includes an output circuit, and the bit split circuit includes a shift register and a buffer, wherein the shift register of the bit split circuit is configured to divide the serial output signal, output from the memory, into the parallel output signals, based on a bit split operation, and wherein the buffer is configured to transfer an output signal, output from the shift register of the bit split circuit, to the output circuit.

6. The display apparatus of claim 5, wherein the output circuit is configured to up-shift and output a level of an output signal output through the buffer.

7. The display apparatus of claim 1, wherein the data map comprises data where logic values to be output by channels for each address are sequentially stored.

8. The display apparatus of claim 1, wherein the level shifter shifts an address value of the data map whenever the enable signal is applied to be first logic, and whenever the enable signal is applied to be second logic which is opposite to the first logic, the level shifter extracts, as an output signal, data included in the address value of the data map to output the output signal as the periodic signals.

9. The display apparatus of claim 1, comprising a timing controller connected to the level shifter, the timing controller configured to output the enable signal and the driving selection signal, wherein an input or output condition of the level shifter is changed based on bidirectional data communication with the timing controller.

10. The display apparatus of claim 9, wherein the controller further includes an interface and a register, wherein the controller is further to configured to perform bidirectional data communication with the timing controller based on the interface, and wherein the register is configured to store a current status of the memory included in the level shifter.

11. The display apparatus of claim 1, wherein the level shifter is configured to shift an address value of the data map when the enable signal is applied to be first logic, and when the enable signal is applied to be second logic opposite to the first logic, the level shifter is configured to extract, as an output signal, data included in the address value of the data map to output the output signal as the periodic signals, and the marker control signal is configured to be applied as a pulse type when the enable signal is applied to be the first logic.

12. A level shifter comprising:

a memory including a data map where logic values to be output by channels for each address are configured to be sequentially stored;

a controller configured to generate a count signal and obtain data from the data map of the memory, based on an enable signal;

a bit split circuit configured to divide a serial output signal output from the memory into a parallel output signal; and a selector configured to generate a selection signal for selecting an operation condition of the controller, based on the enable signal and a driving selection signal, wherein the controller comprises:

a plurality of markers configured to respectively store address values differentiated from one another;

a counter configured to generate a count signal, based on the enable signal; and a de-multiplexer configured to output an enable control signal controlling an enable switch so that the enable signal is applied to the counter and a marker control signal turning on one of marker switches so that an address value included in one of the plurality of markers is applied to an address signal input terminal of the counter, based on the selection signal.

13. The level shifter of claim 12, wherein the controller is configured to shift an address value of the data map when the enable signal is applied to be first logic, and when the enable signal is applied to be second logic opposite to the first logic, the controller is configured to extract, as an output signal, data included in the address value of the data map to output the output signal as periodic signals.

14. The level shifter of claim 12, wherein the data map comprises data where logic values to be output by channels for each address are sequentially stored.

15. The level shifter of claim 12, wherein the level shifter is configured to shift an address value of the data map when the enable signal is applied to be first logic, and when the enable signal is applied to be second logic which is opposite to the first logic, the level shifter is configured to extract, as an output signal, data included in the address value of the data map to output as the periodic signals, and the marker control signal is configured to be applied as a pulse type when the enable signal is applied to be the first logic.

16. The level shifter of claim 12, wherein the controller includes a clock generator and an up-counter, wherein the clock generator is configured to generate a clock which is to be applied to the up-counter, and wherein the up-counter is configured to generate the count signal which increases based on the clock output from the clock generator.

17. The level shifter of claim 16, wherein the up-counter is further configured to output an overflow signal through an overflow signal output terminal, and when the overflow signal is input through a reset input terminal of the up-counter, the up-counter resets the count signal.

18. The level shifter of claim 12, further comprising an output circuit, wherein the bit split circuit includes a shift register and a buffer, and wherein the buffer is configured to transfer an output signal, output from the shift register of the bit split circuit, to the output circuit.

19. The level shifter of claim 18, wherein the output circuit is configured to up-shift and output a level of an output signal output through the buffer.

* * * * *